United States Patent
Kim

(10) Patent No.: US 12,307,107 B2
(45) Date of Patent: May 20, 2025

(54) APPARATUS AND METHOD FOR DYNAMICALLY MANAGING HOST PERFORMANCE BOOSTER CONTROL MODE

(71) Applicant: SK hynix Inc., Gyeonggi-do (KR)

(72) Inventor: Ki Young Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/468,742

(22) Filed: Sep. 18, 2023

(65) Prior Publication Data

US 2024/0241656 A1 Jul. 18, 2024

(30) Foreign Application Priority Data

Jan. 17, 2023 (KR) ........................ 10-2023-0006504

(51) Int. Cl.
*G06F 3/06* (2006.01)
(52) U.S. Cl.
CPC .......... *G06F 3/0634* (2013.01); *G06F 3/0604* (2013.01); *G06F 3/0659* (2013.01); *G06F 3/0679* (2013.01)
(58) Field of Classification Search
CPC .... G06F 3/0604; G06F 3/0634; G06F 3/0659; G06F 3/0679
USPC ....................................................... 711/154
See application file for complete search history.

(56) References Cited

U.S. PATENT DOCUMENTS

| | | | | |
|---|---|---|---|---|
| 10,229,051 B2* | 3/2019 | Hwang | ............... | G06F 12/0246 |
| 10,866,898 B2* | 12/2020 | Lee | .................... | G06F 12/0862 |
| 11,036,625 B1* | 6/2021 | Balluchi | ............ | G06F 12/0246 |
| 2012/0054421 A1* | 3/2012 | Hiratsuka | ............. | G06F 3/0625 |
| | | | | 711/E12.008 |
| 2021/0397365 A1* | 12/2021 | Kim | ...... | G06F 3/0611 |
| 2022/0004341 A1* | 1/2022 | Chen | ...... | G06F 3/061 |
| 2022/0058134 A1* | 2/2022 | Minopoli | ............ | G06F 12/0866 |
| 2022/0253388 A1* | 8/2022 | Zhang | ................. | G06F 12/0868 |
| 2023/0195374 A1* | 6/2023 | Izzi | ....................... | G06F 3/0659 |
| | | | | 711/100 |

(Continued)

FOREIGN PATENT DOCUMENTS

| | | |
|---|---|---|
| KR | 10-2021-0143387 A | 11/2021 |
| KR | 10-2023-0048769 A | 4/2023 |

OTHER PUBLICATIONS

Jedec Standard, "Universal Flash Storage (UFS) Host Performance Booster (HPB) Extension", Version 1.0, JESD220-3, (2019), 34 pgs (Year: 2019).*

*Primary Examiner* — Reginald G Bragdon
*Assistant Examiner* — Aaron D Ho
(74) *Attorney, Agent, or Firm* — IP & T GROUP LLP

(57) ABSTRACT

A memory system which includes a nonvolatile memory device configured to store a mapping table that includes a plurality of map segments each having mapping information between a logical address and a physical address; and a controller configured to: transfer the mapping information to a host through a host performance booster (HPB) operation based on a mode, which is selected by the host from a host control mode and a device control mode, and selectively request the host to change the mode between the host control mode and the device control mode based on a ratio of a read request with a physical address to all read requests, which are transferred from the host.

18 Claims, 13 Drawing Sheets

(56) References Cited

U.S. PATENT DOCUMENTS

2023/0229590 A1\* 7/2023 Bi ...................... G06F 12/0292
                                                        711/154
2023/0359538 A1\* 11/2023 Zhao ................... G06F 11/3037

\* cited by examiner

FIG. 2C

| Map Segment | Logical Address | Physical Address |
|---|---|---|
| 1 | LBA0 | PBA0 |
| | ⋮ | ⋮ |
| | LBAi-1 | PBAi-1 |
| ⋮ | ⋮ | ⋮ |
| k | ⋮ | ⋮ |

150

L2P ENTRY

MAPPING INFORMATION

HPB READ BUFFER COMMAND OPERATION

APPARATUS AND METHOD FOR DYNAMICALLY MANAGING HOST PERFORMANCE BOOSTER CONTROL MODE

CROSS-REFERENCE TO RELATED APPLICATION

This application claims priority under 35 U.S.C. § 119 to Korean Patent Application No. 10-202300006504 filed on Jan. 17, 2023, which is incorporated herein by reference in its entirety.

BACKGROUND

1. Field

Various embodiments of the present disclosure relate to a data processing system and, particularly, to an apparatus and method for dynamically managing a host performance booster control mode.

2. Discussion of the Related Art

A memory system is an apparatus that stores data based on a request from a host, such as a computer, mobile terminals such as a smartphone and a tablet, or various electronic devices. The memory system may further include a controller for controlling memory (e.g., volatile memory/nonvolatile memory). The controller may receive a command from the host, and may execute or control operations for reading, writing, or erasing data with respect to a memory device that is included in the memory system, in response to the received command. is the memory system may be used with host performance booster (HPB) technology that lets the host provide the memory system with a read command together with mapping information between a logical address LBA and a physical address PBA, i.e., map data, to reduce the read latency of the memory system.

SUMMARY

Various embodiments of the present disclosure are directed to an apparatus and method capable of flexibly managing a host performance booster (HPB) control mode of a host and a memory system during runtime.

Technical problems to be achieved in the present disclosure are not limited to the aforementioned technical problems and the other unmentioned technical problems will be clearly understood by those skilled in the art from the following description.

Various embodiments of the present disclosure are directed to providing a memory device, a memory system, a controller included in the memory system, or a data processing system including the memory system.

In an embodiment of the present disclosure, a memory system may include: a nonvolatile memory device configured to store a mapping table that includes a plurality of map segments each having mapping information between a logical address and a physical address; and a controller configured to: transfer the mapping information to a host through a host performance booster (HPB) operation based on a mode, which is selected by the host from a host control mode and a device control mode, and selectively request the host to change the mode between the host control mode and the device control mode based on a ratio of a read request with a physical address to all read requests, which are transferred from the host.

Aspects of the present disclosure are merely some embodiments of the present disclosure. Various embodiments into which technical characteristics of the present disclosure have been incorporated may be derived and understood by a person having ordinary knowledge in the art based on the detailed description of the present disclosure.

According to an embodiment of the present disclosure, the data processing system can selectively change an HPB control mode during the run time according to statuses of the host and the memory system, by adding a control mode capable of dynamically managing the HPB control mode.

Furthermore, according to an embodiment of the present disclosure, the memory system can selectively change an HPB control mode according to a ratio of HPB read request received from the host and transfer mapping information to the host based on the HPB control mode, to increase the ratio of HPB read request and improve performance of an HPB read command operation.

Effects of the present disclosure which may be obtained in the present disclosure are not limited to the aforementioned effects, and other effects not described above may be evidently understood by a person having ordinary knowledge in the art to which the present disclosure pertains from the following description.

BRIEF DESCRIPTION OF THE DRAWINGS

FIG. 2C is a diagram illustrating a meta region included in the memory device according to an embodiment of the present disclosure.

DETAILED DESCRIPTION

Hereinafter, various embodiments of the present disclosure will be described in detail with reference to the accompanying drawings. In the following description, it is to be noted that only a part necessary to understand an operation according to the present disclosure is described and descriptions of the other parts will be omitted in order not to obscure the subject matter of the present disclosure.

Hereinafter, embodiments of the present disclosure are more specifically described with reference to the accompanying drawings.

Figure 1:
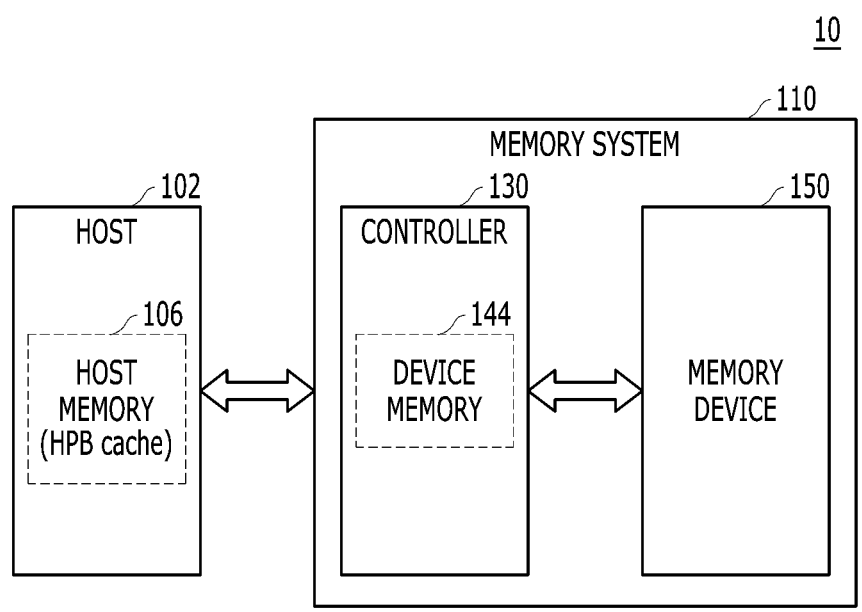
FIG. 1 is a block diagram illustrating a data processing system that includes a host and a memory system according to an embodiment of the present disclosure.

FIG. 1 is a block diagram illustrating a data processing system 10 according to an embodiment of the present disclosure.

Referring to FIG. 1, the data processing system 10 may include a host 102 and a memory system 110.

The data processing system 10 may perform a provisioning operation, i.e., an initial setup operation, at an initial boot thereof.

Specifically, the host 102 may perform the initial setup operation on the memory system 110 before performing operations for reading, writing, or erasing data from or into the memory system 110. The initial setup operation is the operation of setting up various setting values that are needed for the host 102 to access the memory system 110. The host 102 may boot the memory system 110 at the initial setup operation. The host 102 may lock the initial setup operation. The host 102 may not perform the initial setup operation on the memory system 110 again until the locked operation is released.

For example, the host 102 may divide a storage area of the memory system 110 into a plurality of memory regions and set the usage for each of the plurality of memory regions through the initial setup operation. Through the initial setup operation, the host 102 may set up a memory device 150 of the memory system 110 as a user region in which user data is to be stored and a meta region in which logical-to-physical map data (hereinafter, is referred to as "mapping information") is to be stored. Furthermore, the host 102 may additionally set a host performance booster (hereinafter, referred to as HPB) control mode to support an HPB operation through the initial setup operation. In addition, when the HPB control mode is set as a device control mode, the host 102 may preset the number of map segments to be recommended by the memory system 110 at the initial setup operation. The host 102 may preset a size of mapping information to be recommended from the memory system 110 at the initial setup operation.

The host 102 may include a host memory 106. The host memory 106 may be set up when the host 102 performs the initial setup operation on the memory system 110. The host memory 106 may be located on the memory of the host 102, e.g., a static random access memory (SRAM), a synchronous dynamic random access memory (SDRAM), and a dynamic random access memory (DRAM). The host 102 may assign the host memory 106 to store the mapping information. At least a part of whole storage regions of the host memory 106 may include an HPB map storage region for the HPB operations. The HPB operation may be an operation that at least a part of mapping information of the memory system 110 is cached on the host memory 106 and used.

Figure 2A:
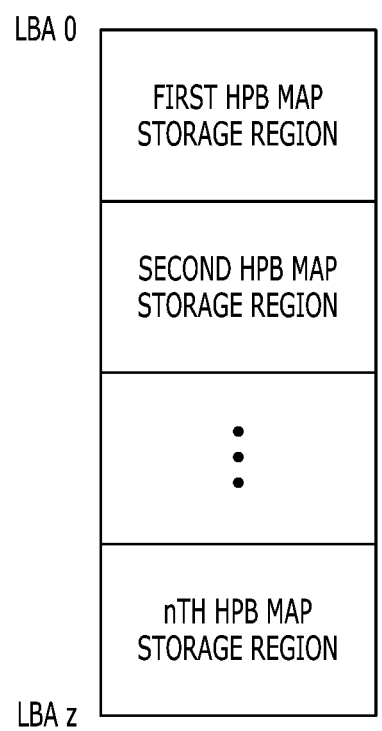
FIG. 2A is a diagram illustrating an HPB map storage region included in a host memory according to an embodiment of the present disclosure.

In FIG. 2A, logical block address areas from a logical block address LBA 0 to a logical block address LBA z may include n HPB map storage regions, e.g., a first HPB map storage region to an nth HPB map storage region. Each of the HPB map storage regions may be a region having the same size as the others. In another embodiment, each of the HPB map storage regions may be a region having a different size from each other. Each of the HPB map storage regions may include mapping information.

In the HPB operation, the mapping information cached on the host memory 106 may be discarded by a unit of the HPB map storage region. The HPB map storage region that is cached on the host memory 106 is referred to as "activated". The HPB map storage region that is not cached on the host memory 106 is referred to as "inactivated". Physical addresses PBA stored in the activated HPB map storage regions, i.e., HPB entries, may be used for the HPB read operation.

The memory system 110 may include the memory device 150 and a controller 130. Due to the physical structure of the memory device 150, while the memory system 110 may perform the write operation and the read operation by a page unit, the memory system 110 may perform the erase operation by a block unit. Therefore, the memory system 110 may have more limitation in performing the write operation, the read operation, and the erase operation than a random access memory device, e.g., DRAM. Accordingly, the memory system 110 may include a flash translation layer (FTL) in the controller 130 and perform command operations through the FTL. The controller 130 may control the memory device 150 included in the memory system 110 in response to a command received from the host 102.

The controller 130 may perform operations in accordance with the command received from the host 102, and, if the operation corresponding to the command is completed, transfer a completion response to the host 102. In detail, the controller 130 may receive a program command, a read command, etc. of the data and control the memory device 150 based on the received commands. In more detail, the controller 130 may generate commands to control the operations of the memory device 150 and transfer the commands to the memory device 150.

For example, when the host 102 wants to store data on the memory system 110, the host 102 may transfer a program command to the memory system 110. If the host 102 receives a ready-to-transfer response from the memory system 110, the host 102 may transfer the data to the memory system 110. The controller 130 may temporarily store the transferred data in a memory (not illustrated) and store the data temporarily stored in the memory (not illustrated) into a selected location of the memory device 150 based on the address mapping information.

For another example, when the host 102 wants to read the data stored in the memory system 110, the host 102 may transfer a read command to the memory system 110. The controller 130 that receives the read command from the host 102 may read data from the memory device 150 based on the read command and temporarily store the read data in a device memory 144. The controller 130 may transfer the data temporarily stored in the device memory 144 to the host 102.

The memory system 110 may support the HPB operation according to the HPB control mode set by the initial setup operation of the host. In this case of supporting the HPB operation, when the host 102 wants to read the data stored in the memory device 150 of the memory system 110, the host 102 may transfer the data to be read and the HPB read command including the logical address LBA and the physical address PBA corresponding to the data to be read to the controller 130 of the memory system 110. This will be described in detail with reference to FIG. 3.

The memory device 150 may include a user region and a meta region. The user region and the meta region may be a plurality of memory blocks included in the memory device 150, which are assigned for certain functions. The user region may indicate a region on which the user data is stored and the meta region may indicate a region on which a mapping table (MT) is stored.

Figure 2B:
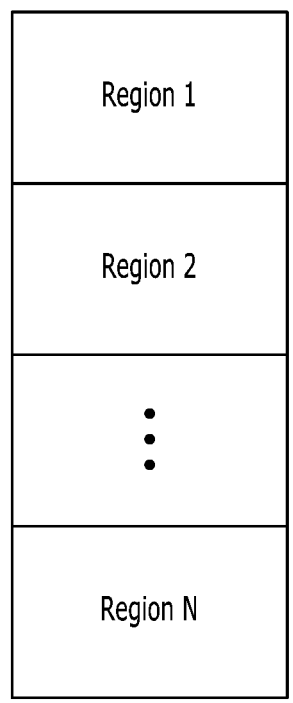
FIG. 2B is a diagram illustrating a user region included in a memory device according to an embodiment of the present disclosure.

The user region may be divided into a plurality of the regions Region 1 to Region N, where N is a natural number equal to or greater than 2. Referring to FIG. 2B, each of the plurality of the regions may have the same size as the others or a different size from each other. Each of the plurality of the regions may include a plurality of memory blocks and each of the plurality of memory blocks may have a plurality of pages. However, the present embodiment is not limited thereto.

The information stored in the meta region, e.g., the mapping table, may include structured information of user data DT stored in the user region as the metadata. For example, referring to FIG. 2C, the meta region may include an L2P mapping table. The L2P mapping table may include a plurality of map segments. Each of the plurality of map segments may include mapping information which is address translation information of the user data DT stored in the user region 121. That is, the mapping information may include i logical addresses and i physical addresses respectively mapped to the logical address, where i is a natural number equal to or greater than 2. That is, each of the plurality of map segments may include i logical address-to-physical address (L2P) entries. The L2P entry may include a logical address and a physical address which is mapped to the corresponding logical address. The logical addresses included in each of the plurality of the map segments may be sorted in ascending order (or descending order) and be fixed. However, the present embodiment is not limited thereto. The physical address mapped to the logical address may be updated to a physical address in which the data associated with the logical address is newly stored. The mapping of the logical address to the physical address may be released in response to an unmap request received from the host.

Each of the plurality of map segments Map Segment 1 to Map Segment k (here, k is a natural number equal to or greater than 2) may correspond to each of the plurality of memory regions. For example, a first map segment Map Segment 1 may correspond to a first region Region 1 and store mapping information corresponding to the first region Region 1. Furthermore, the number of the map segments may be equal to the number of the regions.

In addition, the size of each of the plurality of map segments may be equal to the size of each of the plurality of HPB map storage regions.

Figure 3:
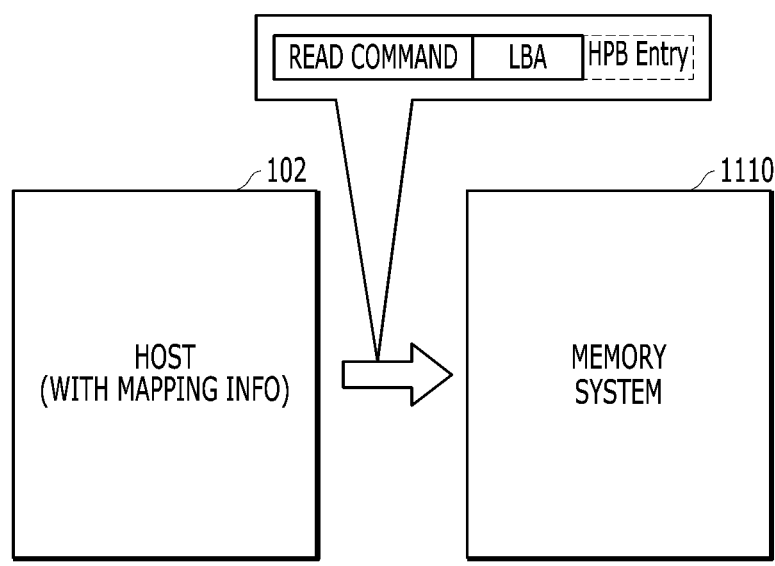
FIG. 3 is a diagram illustrating an example of transaction between a host and a memory system in the data processing system according to an embodiment of the present disclosure.

FIG. 3 illustrates an example of transaction between the host and the memory system in the data processing system according to an embodiment of the present disclosure.

Referring to FIG. 3, the host 102 that stores the mapping information may transfer the logical address LBA and HPB READ COMMAND having HPB entry to the memory system 110. In this case, the HPB entry may include the physical address PBA, which may be recognized by the host 102 based on the mapping information from the memory system 110, associated with the logical address LBA. When the physical address PBA corresponding to the logical address of the data to be read exists in the mapping information stored by the host 102, the host 102 may transfer an HPB READ COMMAND, which includes the logical address LBA and HPB entry, to the memory system 110. In contrast, when the physical address PBA corresponding to the logical address LBA related to a read command does not exist in the mapping information stored by the host 102, the host 102 may transfer a NORMAL READ COMMAND, which includes only the logical address LBA without the HPB entry, to the memory system 110.

Though FIG. 3 illustrates an example of the HPB READ COMMAND, this transaction may be applied to the write command and the erase command which may be transferred from the host 102 to the memory system 110.

Figure 4A:
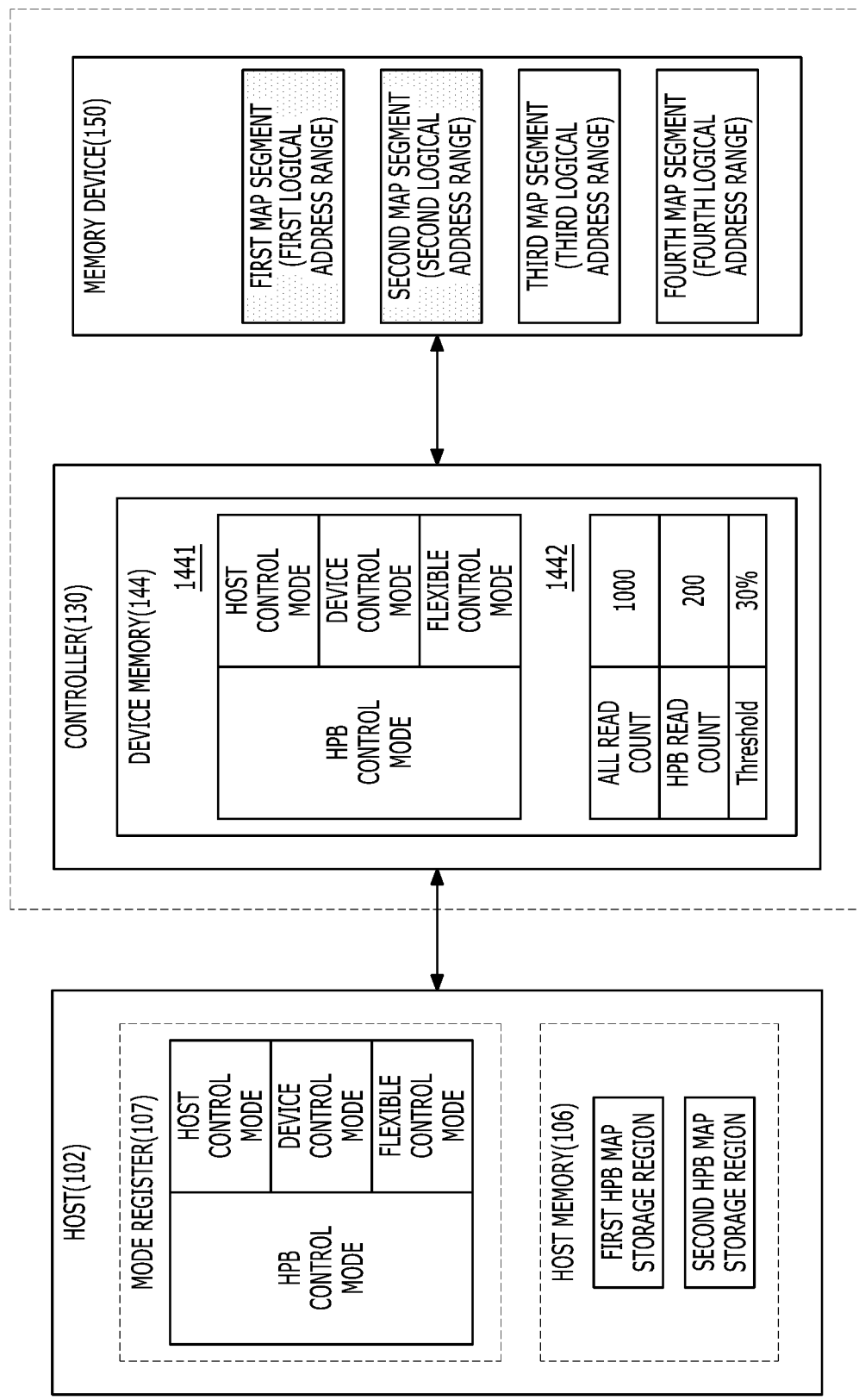
FIGS. 4A and 4B are diagrams illustrating a host and a memory system that support an HPB operation in accordance with an HPB control mode according to an embodiment of the present disclosure.
Figure 4B:
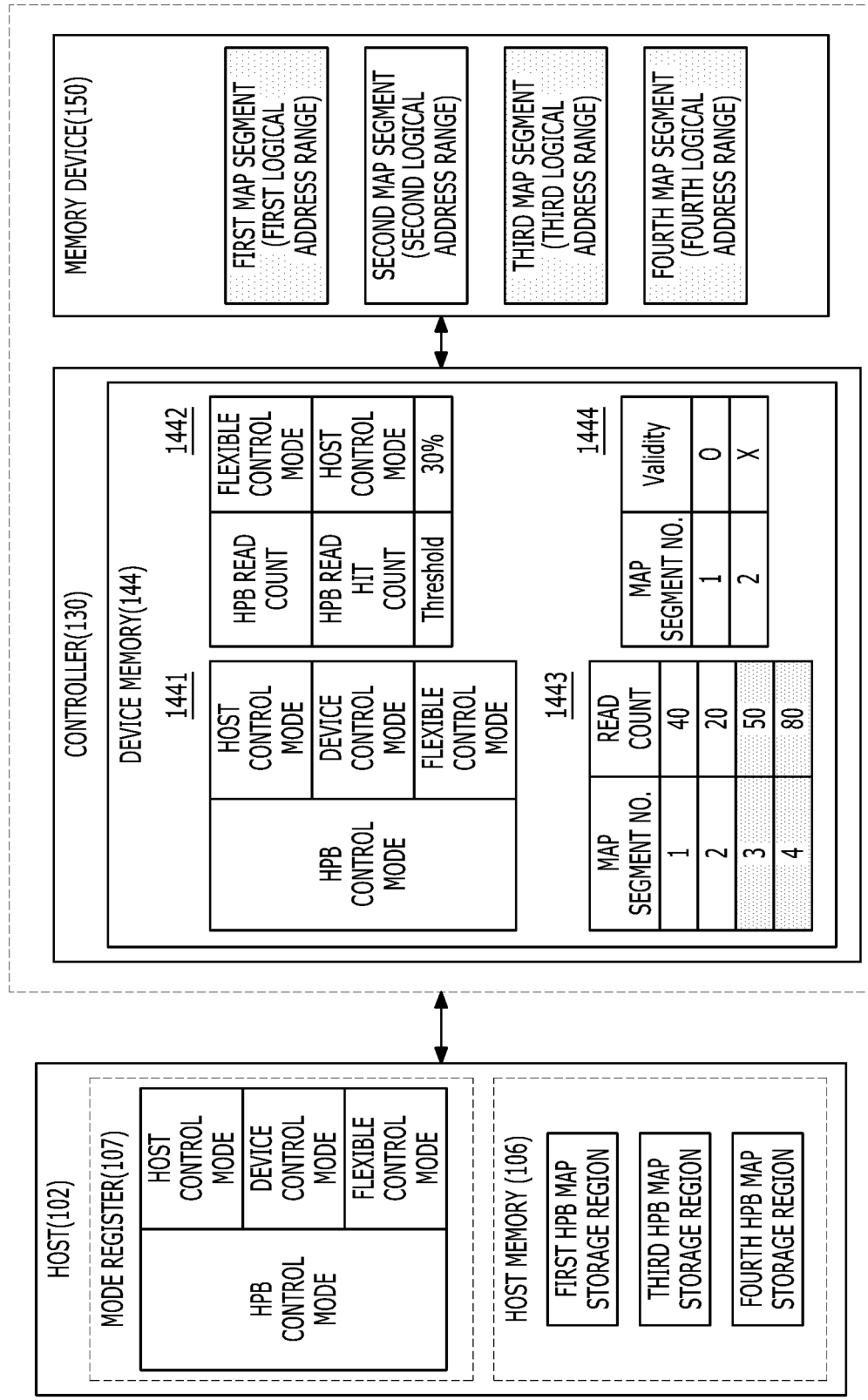

FIGS. 4A and 4B are diagrams illustrating the host and the memory system that support an HPB operation in accordance with an HPB control mode according to an embodiment of the present disclosure.

Before starting the description for FIGS. 4A and 4B, an HPB operation will be briefly described. In general, two HPB control modes may be used for an HPB operation. One is a host control mode and the other is a device control mode.

In the host control mode, the host 102 may determine the mapping information to be cached in the host memory and also determine the mapping information to be discarded from the host memory. In the device control mode, the memory system 110 may select map segments having the mapping information to be cached on the host memory 106 and recommend the selected map segments to the host 102.

The HPB control mode may be set at the initial boot time of the data processing system 10, as described above with reference to FIG. 1, i.e., when the host 102 and the memory system 110 perform the initial setup operation. For example, the host 102 may selectively set the HPB control mode at the performing the initial setup operation. According to the existing UFS specification, a type of the HPB control mode may be set as the host control mode or the device control mode by setting '00' or '01' at the initial setup operation. Accordingly, the host 102 may set up the HPB control mode and transfer it to the memory system 110. The memory system 110 may set up the HPB control mode based on the setup information transferred from the host 102. After the host 102 completes the initial setup operation on the memory system 110, the memory system 110 may transfer, to the host 102, the mapping information between the logical address LBA and the physical address PBA in response to the request from the host 102, so that the host 102 may load the mapping information on the region of the host memory 106 located in the host 102.

Since the host 102 cannot perform the initial setup operation on the memory system 110 until the locked initial setup operation is released, the host control mode or the device control mode as the HPB control mode set in the initial setup operation cannot be dynamically changed during the run time. Therefore, the effect of improving the performance obtainable in a way that the host 102 refers to the mapping information loaded on the host memory 106 may be reduced. For example, when the host 102 sets the HPB control mode as the host control mode at performing the initial setup operation, though the host 102 can determine the logical address range to be stored on the HPB map storage region and the logical address range to be discarded by itself, if the host 102 does not determine the logical address range to be stored or discarded, a ratio of the HPB read request may be decreased. On the other hand, when the host 102 sets the HPB control mode as the device control mode at performing the initial setup operation, the host 102 cannot directly determine the map segment that is not recommended by the memory system 110. Therefore, if the host control mode and the device control mode is dynamically changeable during the runtime according to the statuses of the host 102 and the memory system 110, an HPB cache hit rate, i.e., the ratio of the HPB read request can be increased by reading the mapping information and storing the read mapping information on the HPB memory 106 in accordance with the control mode, such that read performance can be improved. If the host 102 sets the HPB control mode as a flexible control mode during performing the initial setup operation on the memory system 110, the host control mode and the device control mode, each of which is the detail mode of the flexible control mode as the HPB control mode, may be dynamically changeable during the runtime according to the statuses of the host 102 and the memory system 110 without performing an additional initial setup operation. Accordingly, the ratio of the HPB read request may be increased, such that the read performance can be improved.

According to an embodiment of the present disclosure, the memory system 110 may perform the HPB operation according to the HPB control mode (i.e., the flexible control mode) determined at the initial setup operation, and request the host 102 to change a detail mode of the flexible control mode based on the ratio of the HPB read request with the physical address which is transferred from the host 102. According to an embodiment of the present disclosure, the HPB control mode may be one of the host control mode, the device control mode and the flexible control mode, and the flexible control mode may include a detail mode that is one of the host control mode and the device control mode.

The host 102 may store the mapping information received from the memory system 110 on the host memory 106; if the mapping information corresponding to the data to be read exists in the host memory 106, transfer the HPB read request including the mapping information to the memory system 110; if a request for the change of the detail mode of the flexible control mode is received from the memory system 110, determine whether to change the detail mode of the flexible control mode; and notify the determination result to the memory system 110. These will be described in detail with reference to FIGS. 4A and 4B.

FIG. 4A is a diagram illustrating an operation method of the host and the memory system in the host control mode. The controller 130 may include the device memory 144. The device memory 144 may store a HPB control mode table 1441 and a read count table 1442. The host 102 may include the host memory 106 and a mode register 107. The host memory 106 may include the first HPB map storage region and the second HPB map storage region. The mode register 107 may store the HPB control mode table. As shown in FIGS. 4A and 4B, the HPB control mode table may include the host control mode, the device control mode and the flexible control mode. The flexible control mode may include the host control mode and the device control mode in detail. When the HPB control mode is set to the flexible control mode, the HPB control mode may be flexibly and dynamically changed to the host control mode or the device control mode.

The host 102 and the memory system 110 may perform an initial setup operation including a setup for an HPB control mode (i.e., the flexible control mode) and a detail mode of the flexible control mode. The host 102 may preset initial values for the various setting values in order to perform the initial setup operation on the memory system 110. The initial setup operation is the operation of setting up various setting values that are needed for the host 102 to access the memory system 110. At this time, the host 102 may set the HPB control mode (i.e., the flexible control mode) and the detail mode of the flexible control mode in order to perform the HPB operation with the memory system 110. The host 102 can perform the initial setup operation on the memory system 110 after setting the HPB control mode (i.e., the flexible control mode) and the detail mode of the flexible control mode. The host 102 may store the control mode table including the HPB control mode (i.e., the flexible control mode) and detail mode of the flexible control mode, which are set, on the mode register 107. If the HPB control mode is set to the host control mode or the device control mode, the HPB control mode cannot be dynamically changed according to the statuses of the host 102 and the memory system 110, and therefore, the host 102 may set the HPB control mode as the flexible control mode during performing the initial setup operation on the memory system 110 in order to dynamically change the detail mode of the flexible control mode during the runtime. The host 102 may set the detail mode of the flexible control mode after setting the HPB control mode as the flexible control mode. The host 102 may select one of the host control mode and the device control mode, and set the detail mode of the flexible control mode as the selected one. For example, an initial setting value for the detail mode of the flexible control mode may be set as the host control mode. In addition, as described above with reference to FIG. 3, the host 102 may assign HPB map storage regions that may store the mapping information to the host memory 106.

The memory system 110 may store the HPB control mode (i.e., the flexible control mode) and the detail mode of the flexible control mode on the device memory 144 according to the initial setup operation of the host 102. For example, according to the initial setup operation performed by the host, the flexible control mode may be stored as the HPB control mode and the host control mode may be stored as the detail mode of the flexible control mode.

In an embodiment of the present disclosure, it has been described that the host 102 and the memory system 110 may perform operations based on the host control mode as an initial setting mode of the detail mode of the flexible control mode. However, the present embodiment is not limited thereto.

The host 102 may request the memory system 110 for the mapping information to be loaded on the host memory 106 according to the host control mode that is set. Specifically, the host 102 may determine an HPB map storage region that will be activated in order to cache the mapping information corresponding to a certain logical address on the HPB map storage region of the host memory 106. That is, the host 102 may need the mapping information. For example, when the host 102 may determine the HPB map storage region that can store the mapping information or expects a faster data input/output from the memory system 110 in response to the command, the host 102 may need the mapping information. In addition, in accordance with a user's request, the host 102 may need the mapping information. Accordingly, the host 102 may determine the HPB map storage region by determining the logical address range.

The host 102 may transfer, to the memory system 110, an HPB read buffer command that requests the physical address PBA corresponding to a specific logical address range in order to load the mapping information corresponding to the specific logical address range on the determined HPB map storage region. That is, the host 102 may secure a region in which the new mapping information can be stored, i.e., at least one of the HPB map storage regions, on the host memory 106, and then transfer the HPB read buffer command to the controller 130 of the memory system 110 in order to request the physical address PBA corresponding to the specific logical address range.

For example, the host 102 may determine to activate a first HPB map storage region corresponding to a first logical address range 0x00 to 0x0f and a second HPB map storage region corresponding to a second logical address range 0x10 to 0x1f. The host 102 may transfer the HPB read buffer command to the controller 130 in order to request the physical address PBA corresponding the first logical address range 0x00 to 0x0f to be stored on the determined first HPB map storage region and the physical address PBA corresponding to the second logical address range 0x10 to 0x1f to be stored on the determined second HPB map storage region.

The controller 130 may read the mapping information including the physical address PBA corresponding to the logical address range from the memory device 150 in response to the HPB read buffer command transferred from the host 102. The controller 130 may read the map segment corresponding to the logical address range that is received from the host 102, from the mapping table included in the memory device 150. For example, the controller 130 may read mapping information included in a first map segment and a second map segment corresponding to the first logical address range 0x00 to 0x0f and the second logical address range 0x10 to 0x1f in response to the HPB read buffer command received from the host 102.

The controller 130 may transfer a response message to the HPB read buffer command, which includes the mapping information included in the map segments corresponding to the logical address ranges, to the host 102.

The host 102 may store the received mapping information on the HPB map storage region. For example, the host 102 may store the mapping information corresponding to the first logical address range 0x00 to 0x0f, which is received from the controller 130, on the first HPB map storage region. Furthermore, the host 102 may store the mapping information corresponding to the second logical address range 0x10 to 0x1f, which is received from the controller 130, on the second HPB map storage region. Accordingly, a plurality of mapping information are stored on each of the first HPB map storage region and the second HPB map storage region.

The host 102 may retrieve the physical address PBA corresponding to the logical address of the data to be read, which is stored on the HPB map storage region of the host memory 106, generate the HPB read command with the physical address PBA, and then transfer the HPB read command to the controller 130 of the memory system 110. In contrast, if the physical address PBA corresponding to the logical address LBA of the data to be read is not retrieved, the host 102 may generate a normal read command instead of the HPB read command.

If the HPB read command is received from the host 102, the controller 130 may update an all read count A_RD_CNT and an HPB read count H_RD_CNT by incrementing each of their values by 1.

In this case, the reason why the values of the all read count A_RD_CNT and the HPB read count H_RD_CNT are counted is for using their values to determine a ratio of the HPB read command, in detail, to determine a change of the HPB control mode based on the ratio of the HPB read command later, e.g., when the memory system enters an idle mode.

Furthermore, the controller 130 may check whether or not the physical address PBA included in the HPB read command received from the host 102 is valid. The reason why it is checked whether the physical address PBA is valid or not is that the map segment managed by the controller 130 can be modified or updated after the controller 130 transfers the physical address PBA to the host 102. In such a case that the map segment becomes "dirty", since the physical address PBA transferred by the host 102 cannot be used without change, the memory system 110 may determine whether or not the physical address PBA included in the received HPB read command is valid. Accordingly, if the physical address PBA included in the received HPB read command is valid, the controller 130 may read the data from the corresponding address based on the physical address PBA included in the received HPB read command.

In contrast, if the physical address PBA included in the received HPB read command is not valid, the controller 130 may retrieve the physical address PBA corresponding to the logical address, then read the data from the memory device 150 based on the logical address and the retrieved physical address PBA, and transfer the data to the host.

If the host 102 enters an idle mode in which any operation is not performed, the host 102 may transfer a request for entry into the idle mode to the controller 130 of the memory system 110. If the controller 130 is ready to enter the idle mode, the controller 130 may transfer to the host 102 a response message that the entry into the idle mode may be allowable, and then the host 102 and the memory system 110 may enter the idle mode. In this case, the idle mode may correspond to a hibernation state which is an ultra-low power state. In entering the idle mode, the transfer of the command from the host 102 to the memory system 110 may be blocked.

At this time, the controller 130 may calculate the ratio of the HPB read count H_RD_CNT in order to check a ratio of the HPB read counts H_RD_CNT to the all read counts A_RD_CNT. In the idle mode state, the controller 130 may calculate the ratio of the HPB read count H_RD_CNT based on the all read count A_RD_CNT and the HPB read count H_RD_CNT that are stored in the device memory 144. For example, referring to the all read count A_RD_CNT and the HPB read count H_RD_CNT stored in the device memory 144, when the all read count A_RD_CNT is 1000 and the HPB read count H_RD_CNT is 200, the ratio of the HPB read count H_RD_CNT is 20%.

Although not illustrated in the drawings, the controller 130 may calculate the ratio of the HPB read count H_RD_CNT even when the power is in an on/off state. At this time, since the all read count A_RD_CNT and the HPB read count H_RD_CNT that are used to calculate the ratio of the HPB read count H_RD_CNT are not stored in the device memory 144, the all read count A_RD_CNT and the HPB read count H_RD_CNT that are updated in the memory device 150 at every specific period may be loaded from the memory device 150 to the device memory 144 and then the ratio of the HPB read count H_RD_CNT may be calculated.

The controller 130 may compare the calculated ratio of the HPB read count H_RD_CNT with a first reference value which is preset. As the comparison result, if the ratio of the HPB read count H_RD_CNT is equal to or greater than the first reference value, the controller 130 determines not to transfer a message to the host 102, the message requesting the host 102 to change the detail mode of the flexible control mode which is currently set. That is, the controller 130 may maintain the host control mode which is the currently set detail mode of the flexible control mode, and perform the HPB operation based on the host control mode.

In contrast, as the comparison result, if the ratio of the HPB read count H_RD_CNT is less than the first reference value, the controller 130 determines to request the host 102 to change the detail mode of the flexible control mode which is currently set. That is, decrement of the ratio of the HPB read count H_RD_CNT may be determined to indicate that the amount of the HPB read commands using the mapping information cached on the host memory 106 is decreased and a normal read count for the normal read commands increases, such that the mapping information cached on the host memory 106 may be determined as cold mapping information. That is, the controller 130 may determine that the host 102 transfers the normal read request with no physical address to the memory system 110 because the mapping information of the user data, which is frequently requested to be read, is not stored on the host memory 106.

For example, if the ratio of the HPB read count H_RD_CNT is 20% and the threshold is 30%, since the ratio of the HPB read count H_RD_CNT is less than the first reference value, the controller 130 may determine that the ratio of the HPB read command is low. Accordingly, the controller 130 may need to recommend, to the host memory 106, the map segment corresponding to the region that is frequently read. In order to recommend, to the host memory 106, the map segment corresponding to the region that is frequently read, the HPB control mode needs to be changed. Therefore, the controller 130 may determine to request the host 102 to change the detail mode of the flexible control mode.

After the host 102 and the memory system 110 enter an active mode from the idle mode, the controller 130 may transfer a message to the host 102, the message requesting the host 102 to change the detail mode of the flexible control mode, in order to request a change from the host control mode, which is the currently set to the detail mode of the flexible control mode, to the device control mode. At this time, the message requesting the host 102 to change the detail mode of the flexible control mode is included in a response message to the command transferred after the entry into the active mode.

If the host 102 receives the message requesting the change of the detail mode of the flexible control mode from the memory system 110, the host 102 may determine whether to change the detail mode of the flexible control mode currently set in the mode register 107.

If the host 102 determines to change the detail mode of the flexible control mode, the host 102 may check and then change the detail mode of the flexible control mode. For example, the host 102 may check that the detail mode of the flexible control mode set in the mode register is the host control mode. The host 102 may change the detail mode of the flexible mode from the host control mode to the device control mode in response to the request for the change of the detail mode of the flexible control mode from the memory system 110. Furthermore, the host 102 may transfer a message to the controller 130, the message notifying that the detail mode of the flexible control mode has been changed.

In contrast, if the host 102 determines not to change the detail mode of the flexible control mode, the host 102 may transfer a message to the controller 130, the message notifying the controller 130 that the detail mode of the flexible control mode has not been changed.

On receiving the message notifying that the detail mode of the flexible control mode has been changed, the controller 130 may change the detail mode of the flexible control mode which is stored in the device memory 144, and initialize the all read count A_RD_CNT and the HPB read count H_RD_CNT.

FIG. 4B is a block diagram illustrating the data processing system in the device control mode according to an embodiment of the present disclosure. The controller 130 may include the device memory 144. The device memory 144 may store a HPB control mode table 1441 and a read count table 1442. The host 102 may include the host memory 106 and a mode register 107. The host memory 106 may include the first HPB map storage region and the second HPB map storage region. The mode register 107 may store the HPB control mode table. As shown in FIGS. 4A and 4B, the HPB control mode table may include the host control mode, the device control mode and the flexible control mode. The flexible control mode may include the host control mode and the device control mode in detail. When the HPB control mode is set to the flexible control mode, the HPB control mode may be flexibly and dynamically changed to the host control mode or the device control mode.

Referring to FIG. 4B, the controller 130 may determine a map segment that is frequently read, based on a map load count table 1443 stored in the device memory 144. That is, the controller 130 may determine the map segment including the mapping information corresponding to the frequently read data based on counts of a plurality of map segments that are stored on the map load count table 1443 stored in the device memory 144. In this case, the map load count table 1443 may include a plurality of map segments and a plurality of map load counts respectively corresponding to the map segments. The map load count may indicate a number of times that the map segment is read from the memory device 150 and stored in the device memory 144. That is, the map load count may indicate the number of performing map load operations for each of the map segments.

The map load operation may be performed for the logical address of the data which is frequently and most recently requested to be read. The map segment for which the map load operation is performed is stored on the device memory 144 of the controller 130.

If the map segment having the logical address received along with the read command from the host 102 exists in the device memory 144, the address translation operation that translates the received logical address to the physical address can be rapidly performed. In contrast, if the map segment having the logical address received along with the read command from the host 102 does not exist in the device memory 144, the 'map load operation,' which reads the map segment having the received logical address from the memory device 150 and stores the map segment on the device memory 144, needs to be performed first, which may cause an increase of the time needed for the address translation operation. The map segment of which the map load count is high may be the map segment that is frequently stored in the device memory 144 and frequently read. In contrast, the map segment of which the map load count is low may be the map segment that stays in the device memory 144 for a long time. That is, the map load count table 1443 may be a table for identifying the map segment corresponding to a region including the frequently read data. Therefore, the controller 130 may determine hot map segments based on the map load count table 1443.

Specifically, the controller 130 may check whether or not the count of the map segment in the map load count table 1443 is equal to or greater than a predetermined second reference value. If the count of the map segment is equal to or greater than the second reference value, the controller 130 may determine that the map segment includes the mapping information of the frequently read data. Accordingly, the controller 130 may determine the map segment of which count is equal to or greater than the second reference value and recommend the map segment to the host 102. For example, if the second reference value is set as '50', as a result of checking counts of the map segments corresponding to the plurality of regions, the counts for a third map segment for a third region and a fourth map segment for a fourth region are '50' and '80', respectively, which are equal to or greater than the second reference value. Therefore, the controller 130 may determine that the third map segment and the fourth map segment are hot map segments and recommend, to the host 102, the mapping information of the third map segment and the fourth map segment.

In contrast, the controller 130 may determine a map segment to be inactive among the map segments loaded on the host memory 106 based on the bit map of the map segment included in an HPB map segment validity table 1444 managed in the device memory 144. The map segment validity table 1444 may include the number of the map segment loaded on the host memory 106 and a validity bit map for the map segment. The map segment validity table 1444 may be a table for managing validities of the map segments which are loaded on the host memory 106. If an internal operation is performed for a specific memory block among the memory blocks included in the region corresponding to the map segment loaded on the host memory 106, the mapping information corresponding to the specific memory block can be changed. Accordingly, the controller 130 may change the validity of the map segment, which is loaded on the HPB memory 106, to "NO" validity, among the map segments corresponding to the regions for which the internal operation has been performed. Accordingly, the controller 130 may determine to discard the map segment that has no validity based on the map segment validity table 1444 stored in the device memory 144. For example, referring to the HPB map segment validity table 1444, the validity of the second map segment is indicated as "NO". Therefore, the controller 130 may determine to discard the mapping information of the second map segment and recommend the second map segment to the host 102.

The controller 130 may transfer a response message, which includes recommendation related to the determination to load the hot map segment on the host memory 106 and to discard the map segment from the host memory 106, to the host 102. The response message transferred to the host 102 may be a response message to the command that is previously transferred from the host 102 to the memory system 110. For example, the response message may be UFS protocol information units (UPIU). That is, the recommendation for the map segment that is determined to be active and inactive may be included in the UPIU and transferred to the host 102.

In response to the recommendation with regard to the map segment to be discarded, the host 102 may determine whether to discard the mapping information stored on the HPB map storage region corresponding to the map segment to be discarded from the HPB map storage region. If the host 102 determines to discard the mapping information regarding the corresponding map segment from the HPB map storage region, the host 102 may delete all of the mapping information stored on the HPB map storage region corresponding to the recommended map segments. For example, the host 102 may delete all of the mapping information stored on the second map storage region corresponding to the second map segment that is recommended by the controller 130 to be discarded.

If the host 102 determines not to discard the mapping information included in the HPB map storage region, despite the recommendation from the memory system 110, the mapping information may be maintained on the host memory 106.

In response to the recommendation regarding the hot map segment, the host 102 may determine to cache the mapping information included in the recommended hot map segment on the host memory 106. If the host 102 determines not to cache the mapping information included in the hot map segment, despite the recommendation from the memory system 110, the mapping information stored on the HPB storage regions of the host memory 106 may not be changed and may be maintained.

If the host 102 determines to cache the mapping information included in the hot map segment that is recommended by the controller 130, the host 102 may transfer an HPB read buffer command, which requests the mapping information included in the hot map segment, to the controller 130. For example, the host 102 may transfer the HPB read buffer command, which requests the mapping information of the third map segment and the fourth map segment, to the controller 130.

In response to the HPB read buffer command received from the host 102, the controller 130 may read the mapping information of the corresponding map segments from the memory device 150 and then transfer the response message to the read buffer command to the host 102, the response message including the mapping information of the corresponding map segments. For example, the controller 130 may transfer the mapping information stored in the third map segment and the fourth map segment to the host 102.

The host 102 may store the mapping information of the hot map segments received from the controller 130 on the HPB map storage regions, respectively. For example, the host 102 may store the mapping information of the third map segment on the third HPB map storage region and store the mapping information of the fourth map segment on the fourth HPB map storage region.

After that, the memory system 110 may check whether or not the number of the hot map segments recommended to the host 102 is equal to or greater than the number of the recommended map segments, which is set by the host 102. In this case, the number of the recommended map segments, which is set by the host 102, may be the number that the host 102 has set at performing the initial setup operation. That is, when the host 102 performs the initial setup operation, the host 102 may preset the number of the map segments recommended by the memory system 110 at performing the device control mode.

If the number of the hot map segments recommended to the host 102 through the above operations is equal to or greater than the number for the recommended map segments, which is set by the host 102, the controller 130 may request the host 102 to change to the detail mode of the flexible control mode. The controller 130 may transfer a message to the host 102, the message requesting a change of the detail mode of the flexible control mode, in order to request for the change of the device control mode, which is currently set to detail mode of the flexible control mode, to the host control mode. At this time, the message requesting a change of the detail mode of the flexible control mode may be transferred by being included in a response message to the command received after the entry into the active mode.

In contrast, if the number of the recommended hot map segments is less than the number for the recommended map segments, the controller 130 may perform an operation of determining hot map segments to be loaded on the host memory 106 without requesting the host 102 to change the detail mode of the flexible control mode.

If the host 102 receives the message requesting the change of the detail mode of the flexible control mode, the host 102 may determine whether to change the detail mode of the flexible control mode currently set in the mode register 107. If the host 102 determines to change the detail mode of the flexible control mode, the host 102 may change the detail mode of the flexible control mode and then transfer a message to the controller 130, the message notifying that the detail mode of the flexible control mode has been changed. For example, the host 102 may change the detail mode of the flexible control mode from the device control mode to the host control mode.

In contrast, if the host 102 determines not to change the detail mode of the flexible control mode, the host 102 may transfer a message to the controller 130, the message notifying that the detail mode of the flexible control mode has not been changed.

In another embodiment of the present disclosure, when the host performs the initial setup operation on the memory system, if the device control mode is selected as the detail mode of the flexible control mode, the controller 130 may perform the HPB operation based on the device control mode. In the low power mode state in which the power supplied from the host 102 is blocked, the controller 130 may calculate the ratio of the HPB read count H_RD_CNT, and, if the calculated ratio of the HPB read count H_RD_CNT is lower than a preset threshold, the controller 130 may request the host 102 to change the detail mode of the flexible control mode. In this case, if the power supplied from the host 102 is on, the controller 130 may transfer the request for the change of the detail mode of the flexible control mode to the host 102. The host 102 may determine whether to change the detail mode of the flexible control mode, in response to the request for the change of the detail mode of the flexible control mode from the controller 130, and, if the host 102 determines to change the detail mode of the flexible control mode, the host 102 may transfer a message to the controller 130, the message notifying that the detail mode of the flexible control mode has been changed from the device control mode to the host control mode. The controller 130 may perform the HPB operations based on the host control mode, and after that, during the low power mode state in which the power supplied from the host 102 is blocked, the controller 130 may request the host 102 to change the host control mode to the device control mode based on the ratio of the HPB read count H_RD_CNT.

Figure 5:
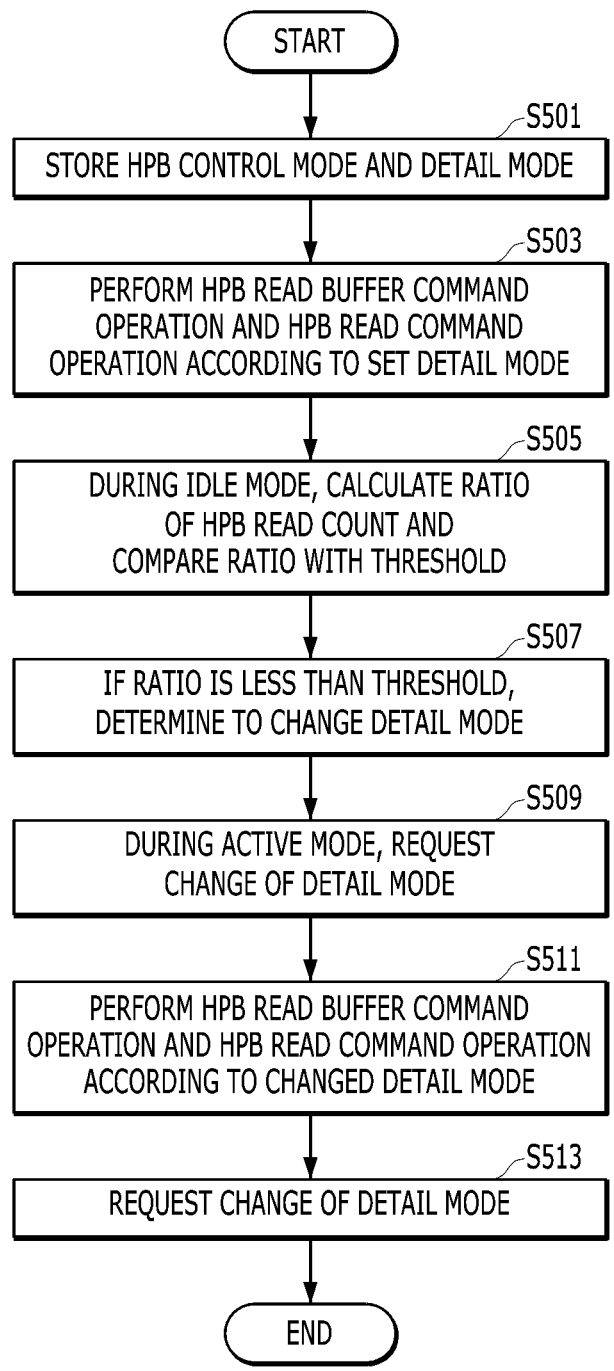
FIGS. 5 to 10 are diagrams for describing operation methods of a host and a memory system according to an embodiment of the present disclosure.

FIG. 5 is a flowchart for describing an operation method of the host and the memory system in brief according to an embodiment of the present disclosure.

Referring to FIG. 5, in operation S501, a memory system 110 may store an HPB control mode (i.e., the flexible control mode) and a detail mode of the flexible control mode that are set when the host 102 performs an initial setup operation. For example, the HPB control mode may be the flexible control mode and the detail mode of the flexible control mode may include a host control mode. In this case, the detail mode of the flexible control mode may be set as a device control mode instead of the host control mode.

In operation S503, the memory system 110 may perform an HPB read buffer command operation and an HPB read command that are received from the host 102 according to the host control mode. The memory system 110 may read a map segment from the memory device 150 in response to the HPB read buffer command received from the host 102 and then transfer the map segment to the host 102.

After the HPB read buffer command operation, if the read command is received, the memory system 110 may check whether the read command includes a physical address. If the read command includes the physical address, the memory system 110 may increase an HPB read command count H_RD_CNT and an all read command count A_RD_CNT. In contrast, if the read command does not include the physical address, the memory system 110 may determine the read command as a normal read command and increase only the all read count A_RD_CNT.

If the command is the HPB read command, the memory system 110 may check a validity of the physical address PBA of the mapping information included in the HPB read command, if the physical address PBA is valid, the memory system may perform the HPB read command based on the mapping information.

In contrast, if the physical address PBA is not valid, the memory system 110 may retrieve a physical address PBA corresponding to the logical address included in the read command and then perform the HPB read command.

In operation S505, during an idle mode, the memory system 110 may calculate the ratio of the HPB read count H_RD_CNT based on the all read count A_RD_CNT and the HPB read count H_RD_CNT which are stored in the device memory 144. Furthermore, the memory system 110 may check whether or not the calculated ratio of the HPB read count H_RD_CNT is less than a predetermined first reference value.

As the check result, in operation S507, if the ratio of the HPB read count H_RD_CNT is less than the first reference value, the memory system 110 may determine to change the detail mode of the flexible control mode. Specifically, if the ratio of the HPB read count H_RD_CNT is less than the first reference value, the memory system 110 may determine that an occurrence rate of the HPB read commands generated by the host 102 is decreased.

The memory system 110 needs to load a new map segment on the host 102 in order to increase the ratio of the HPB read count H_RD_CNT. Accordingly, the memory system 110 may request the host 102 to change the detail mode of the flexible control mode in order to recommend the map segment of the region in which data is frequently read.

In contrast, although not illustrated in FIG. 5, if the ratio of the HPB read count H_RD_CNT is equal to or greater than the first reference value, the memory system 110 may determine that the occurrence rate of the HPB read commands using the mapping information cached on the host memory 106 of the host 102 is high. Accordingly, the memory system 110 may determine to maintain the host control mode which is currently set instead of changing the detail mode of the flexible control mode.

In operation S509, after entry into the active state, the memory system 110 may transfer a message to the host 102, the message requesting a change of the detail mode of the flexible control mode. The memory system 110 may request the host 102 to change the detail mode of the flexible control mode from the host control mode to the device control mode. In this case, the message requesting the host 102 to change the detail mode of the flexible control mode may be included in a response message to the command received by the memory system 110 from the host 102.

In operation S511, if the memory system 110 receives a response from the host 102, the response notifying that the change of the detail mode of the flexible control mode is completed, the memory system 110 may determine the map segment to be loaded on the HPB map storage region of the host memory or the map segment to be discarded among the map segments stored on the HPB map storage regions, and recommend the determined map segment to the host 102. In response to the recommendation, the memory system 110 may receive an HPB read buffer command from the host 102. The memory system 110 may read a corresponding map segment from the memory device 150 in response to the HPB read buffer command and then transfer the map segment to the host 102.

In operation S513, the memory system 110 may transfer the message to the host 102, the message requesting a change of the detail mode of the flexible control mode. For example, the memory system 110 may request the change of the detail mode of the flexible control mode from the device control mode to the host control mode. In this case, the message requesting the host 102 to change the detail mode of the flexible control mode may be included in the response message to the command received by the memory system 110 from the host 102.

An operating method described in FIG. 5 will be described below in detail with reference to FIGS. 6 to 10.

Figure 6:
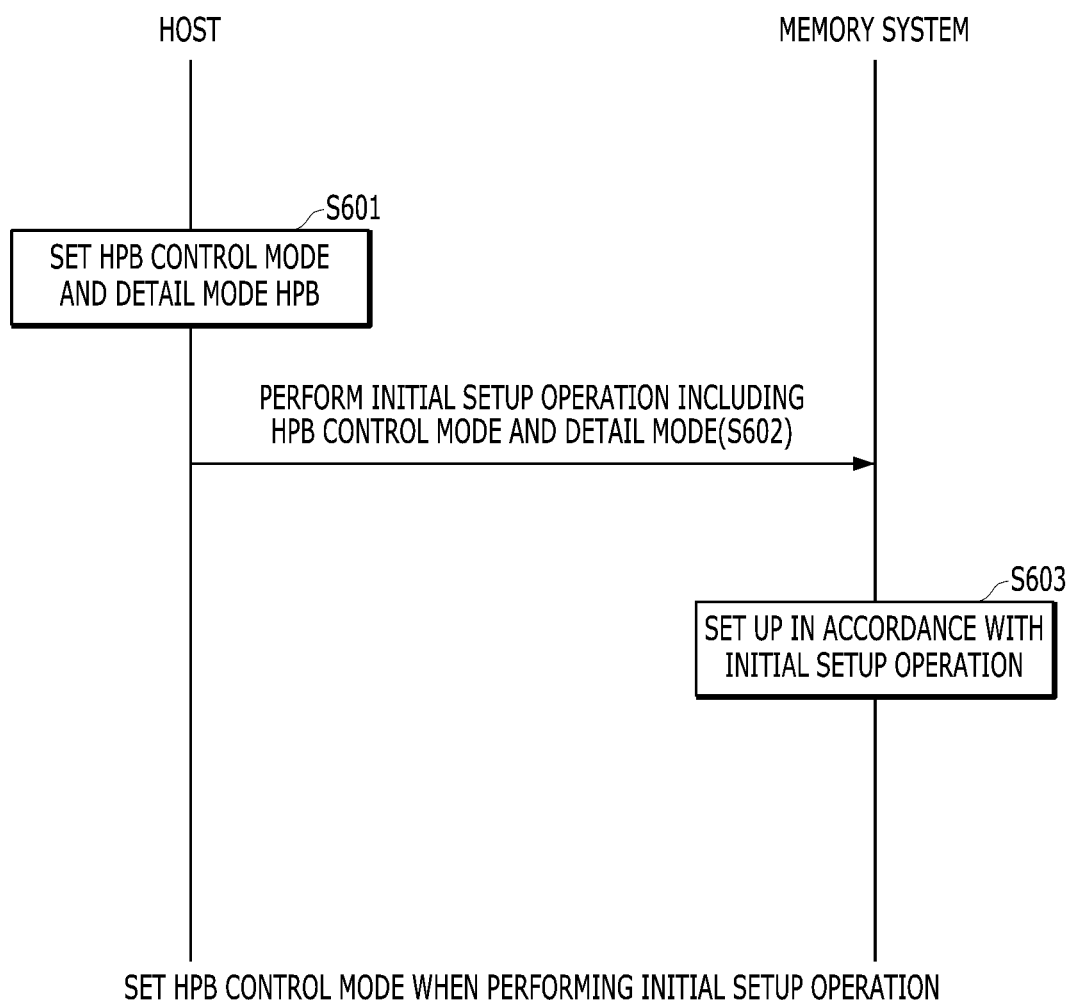

FIG. 6 is a sequence diagram for describing an initial setup operation of the host and the memory system in accordance with an embodiment of the present disclosure. FIG. 6 is a diagram illustrating the operation S501 of FIG. 5 in detail.

Referring to FIG. 6, in operations S601 to S603, the host 102 may perform an initial setup operation on the memory system 110. The initial setup operation is an operation that sets various setting values needed for the host 102 to access the memory system 110. At this time, the host 102 may set the HPB control mode (i.e., the flexible control mode) and the detail mode of the flexible control mode. After setting the HPB control mode (i.e., the flexible control mode) and the detail mode of the flexible control mode, the host 102 may perform the initial setup operation on the memory system 110. The host 102 may store the HPB control mode (i.e., the flexible control mode) and the detail mode of the flexible control mode in the mode register 107. If the HPB control mode is set to the host control mode or the device control mode, the HPB control mode is not dynamically changeable according to the statuses of the host 102 and the memory system 110, and therefore, the host 102 may set the HPB control mode as the flexible control mode at the initial setup operation in order to dynamically change the detail mode of the flexible control mode during the runtime. The host 102 may set the detail mode of the flexible control mode after setting the HPB control mode as the flexible control mode. The host 102 may set the detail mode of the flexible control mode as one of the host control mode and the device control mode. For example, an initial setting value of the detail mode of the flexible control mode may be set as the host control mode.

Furthermore, when the initial setup operation is performed, in case that the detail mode of the flexible control mode is the device control mode, the host 102 may set the number of map segments that are recommended, in order to receive a recommendation for map segments from the memory system 110.

Furthermore, in order to support the HPB operation, the host 102 may assign HPB map storage regions capable of storing mapping information to the host memory 106.

The memory system 110 may divide the memory device 150 into a plurality of memory regions and set up the usage for each of the plurality of memory regions according to the initial setup operation of the host 102. Simultaneously, the memory system 110 may set the HPB control mode (i.e., the flexible control mode) and the detail mode of the flexible control mode. For example, through the initial setup operation performed by the host, the HPB control mode may be set as the flexible control mode and the detail mode of the flexible control mode may be set as the host control mode. In this embodiment, the host 102 and the memory system 110 may perform operations based on the host control mode which is the detail mode of the flexible control mode. However, the present embodiment is not limited thereto. After the operation S603, the host 102 may request mapping information from the memory system 110, the mapping information to be loaded on the host memory 106 in accordance with the host control mode that is set as the detail mode of the flexible control mode. This will be described in detail with reference to FIG. 7.

Figure 7:
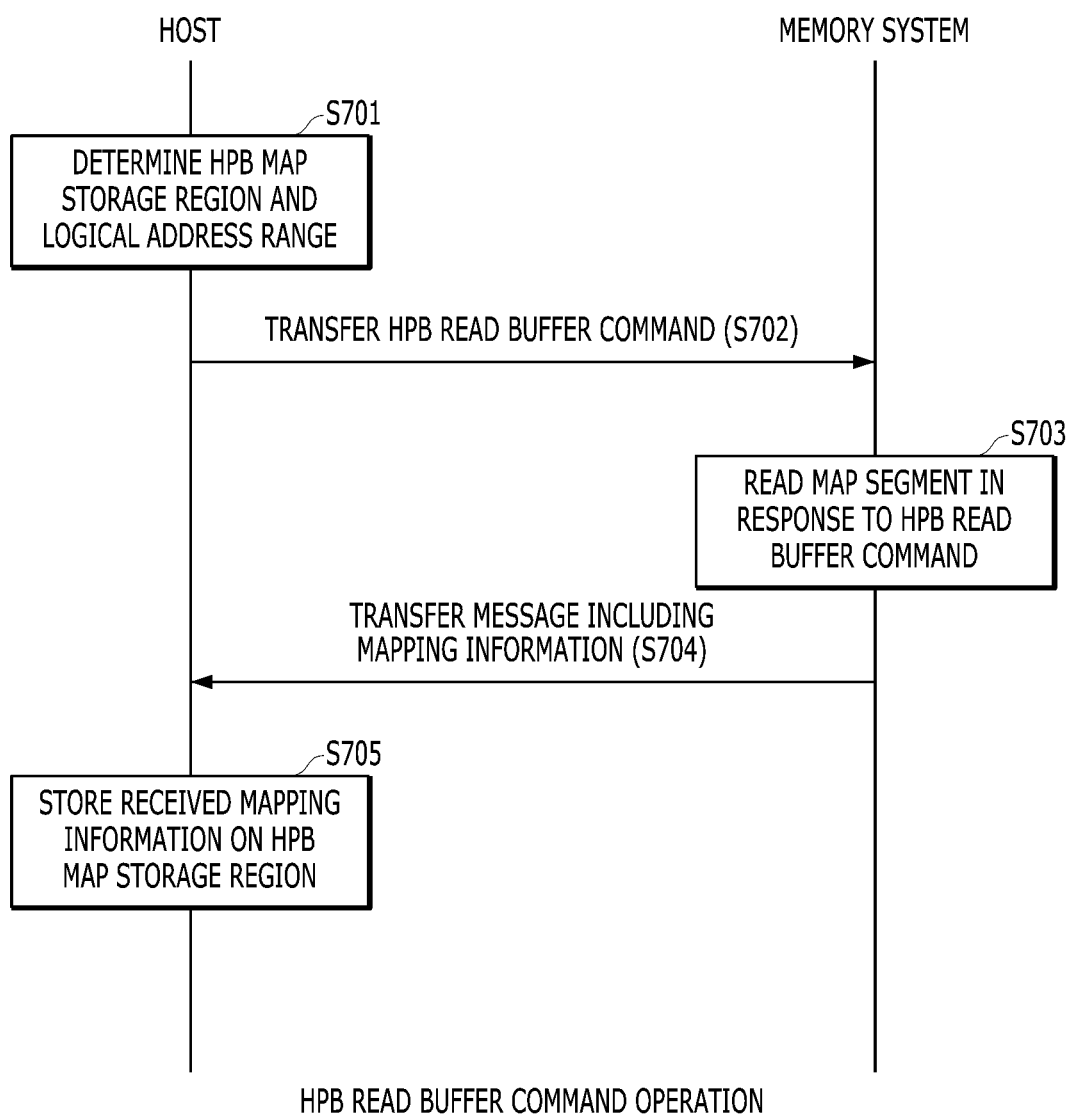

FIG. 7 is a sequence diagram for describing the HPB read buffer command operation based on the host control mode in accordance with an embodiment of the present disclosure. FIG. 7 is a diagram illustrating the operation S503 of FIG. 5 in detail.

FIG. 7 illustrates a method of loading mapping information, which is stored in the memory device 150 of the memory system 110, on the host memory 106 of the host 102 according to the HPB control mode (i.e., the flexible control mode) and the detail mode of the flexible control mode that are set at the initial setup operation between the host 102 and the memory system 110.

Referring to FIG. 7, in operation S701, the host 102 may determine a certain logical address range in order to cache a physical address PBA corresponding to the certain logical address on the HPB map storage region of the host memory 106.

In operation S702, the host 102 may transfer the HPB read buffer command to the memory system 110, the HPB read buffer command requesting the physical addresses PBA corresponding to the determined logical address range to the memory system 110, in order to load the physical addresses PBA corresponding to the determined logical address range.

In operations S703 and S704, the memory system 110 may read the map segment corresponding to the certain logical address range from the memory device 150 in response to the HPB read buffer command received from the host 102. The memory system 110 may transfer the mapping information included in the read map segment, which is included in the response message to the read buffer command, to the host 102.

In operation S705, the host 102 may store the mapping information transferred from the memory system 110 in the determined HPB map storage region.

Figure 8:
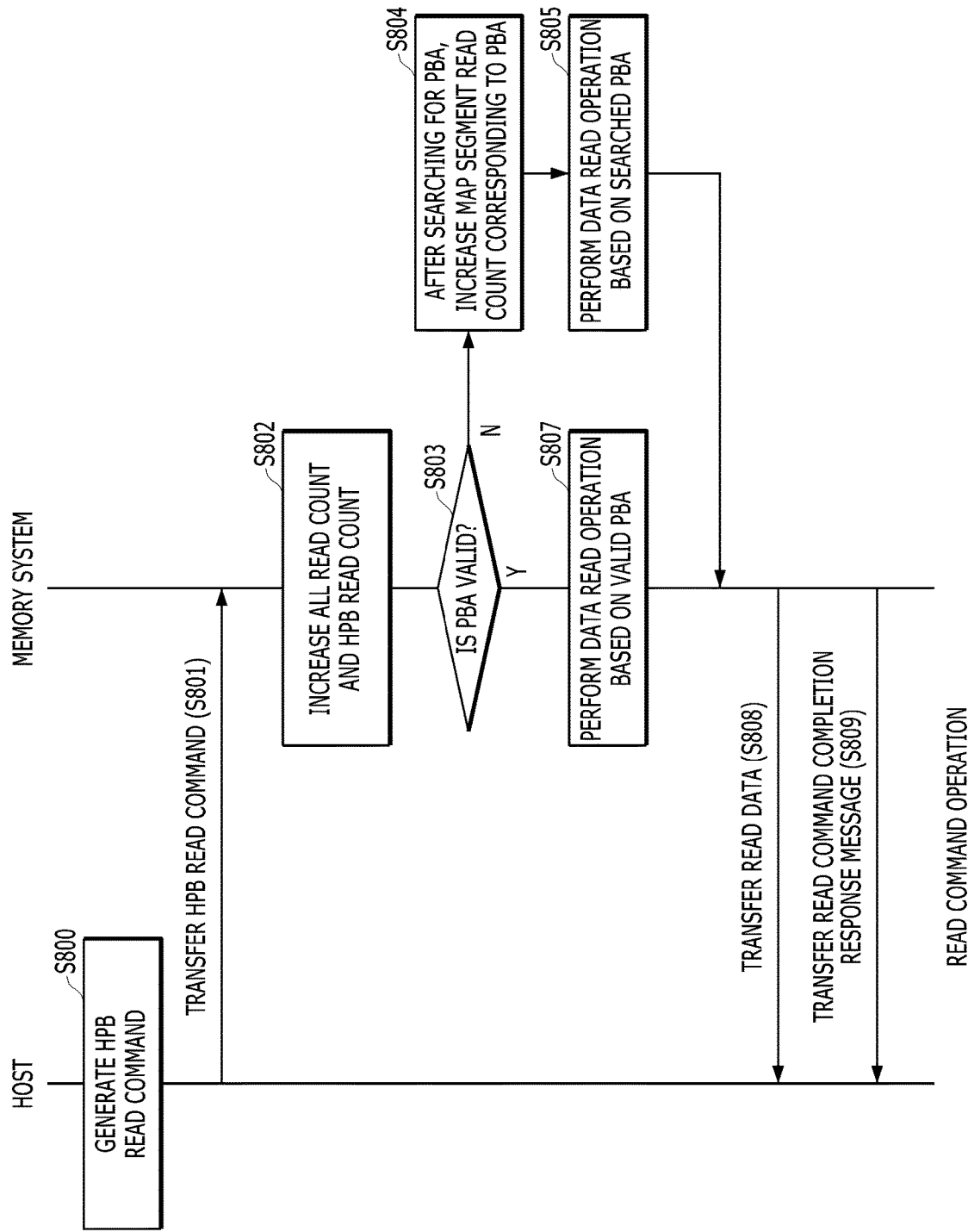

FIG. 8 is a sequence diagram for describing HPB read command operation according to the host control mode according to an embodiment of the present disclosure. FIG. 8 is a diagram illustrating the operation S503 of FIG. 5 in detail.

In operation S800, the host 102 may retrieve the physical address PBA corresponding to the logical address LBA of the data to be read from the HPB map storage region of the host memory 106 and generate an HPB read command. In contrast, if the physical address PBA corresponding to the logical address LBA of the data to be read is not retrieved, the host 102 may generate a normal read command instead of the HPB read command.

In operation S801, the host 102 may transfer the generated HPB read command to the memory system 110. The HPB read command may include the physical address PBA corresponding to the logical address LBA of the data to be read.

In operation S802, on receiving the HPB read command from the host 102, the memory system 110 may check whether the HPB read command includes the physical address PBA, if the physical address PBA is included therein, determine the command as the HPB read command, and then increment the HPB read count H_RD_CNT and the all read count A_RD_CNT which are managed in the device memory 144.

In operation S803, the memory system 110 may check whether or not the physical address PBA included in the HPB read command is valid.

As the check result, if the physical address PBA included in the received HPB read command is not valid (N in operation S803), in operation S804, the memory system 110 may ignore the physical address PBA included in the received HPB read command. The memory system 110 may search for a physical address PBA corresponding to the logical address included in the received HPB read command. Furthermore, the memory system 110 may increment the read count of the map segment including the logical address and the physical address PBA corresponding to the logical address.

In operation S805, if the physical address PBA included in the HPB read command is not valid, the memory system 110 may perform the read operation in the same manner as the case of receiving the normal read command instead of the HPB read command. The memory system 110 may perform the read operation based on the physical address PBA which is searched for based on the logical address.

In contrast, if the physical address PBA included in the received HPB read command is valid (Y in operation S803), in response to the HPB read command, the memory system 110 may read data based on the physical address PBA included in the HPB read command (S807).

In operation S808, the memory system 110 may transfer the read data to the host 102. In addition, in operation S809, the memory system 110 may transfer a message to the host 102, the message notifying that operations corresponding to the received HPB read command are completed.

Figure 9:
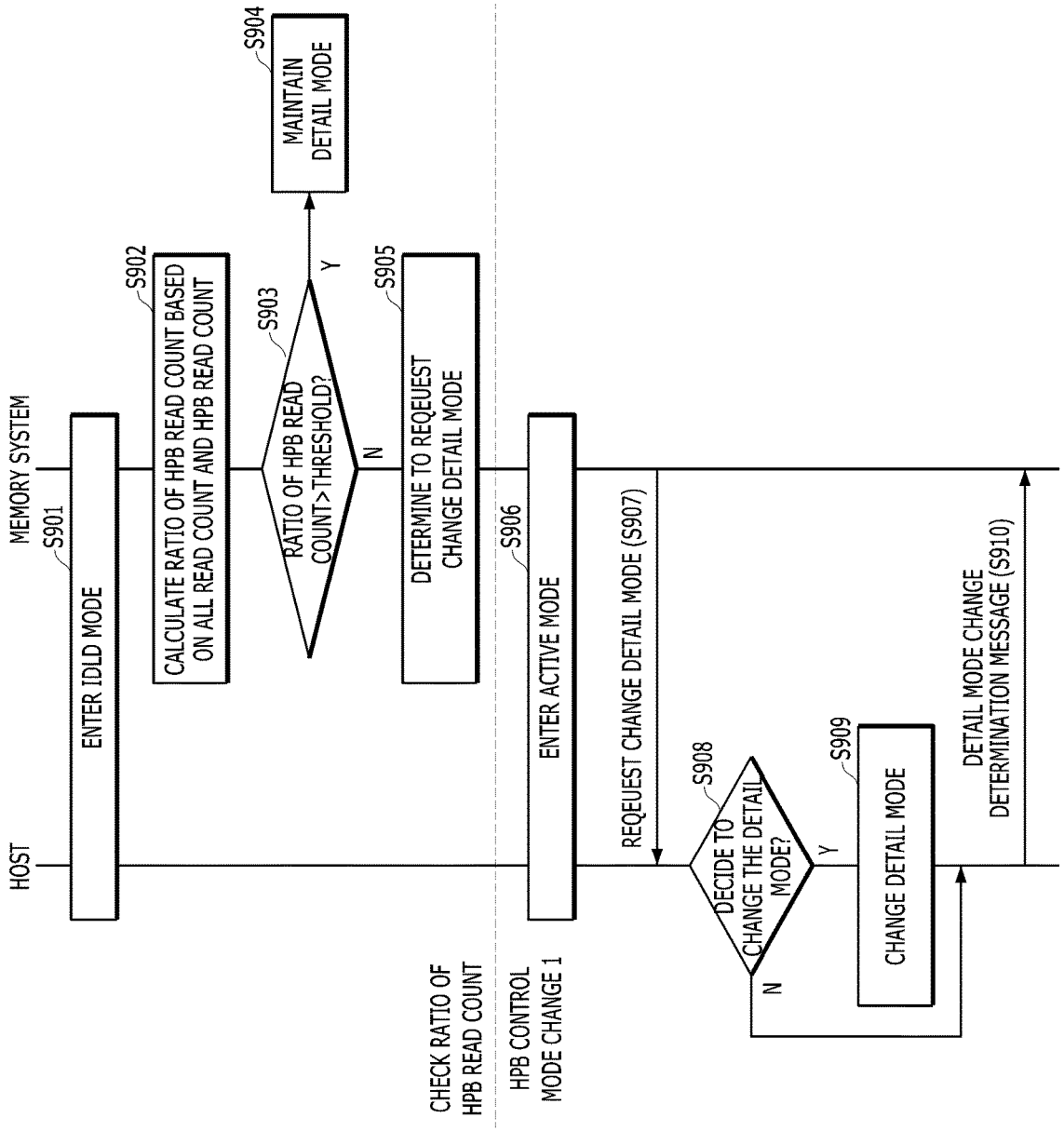

FIG. 9 is a sequence diagram for describing an operation of changing the detail mode of the flexible control mode according to an embodiment of the present disclosure. FIG. 9 is a diagram illustrating the operations S505 to S509 of FIG. 5 in detail.

Referring to FIG. 9, in operations S901 and S902, during the idle mode after completing the operations corresponding to the command received from the host 102, the memory system 110 may calculate a ratio of the HPB read count H_RD_CNT in order to check the ratio of the HPB read count H_RD_CNT to the all read count A_RD_CNT. If the host 102 and the memory system 110 enter the idle mode, the transmission of the command from the host 102 to the memory system 110 is blocked. At this time, the memory system 110 in the idle mode state may calculate the ratio of the HPB read count H_RD_CNT based on the all read count A_RD_CNT and HPB read count H_RD_CNT that are stored in the device memory 144.

In operation S903, the memory system 110 may compare the calculated ratio of the HPB read count H_RD_CNT with a predetermined first reference value.

As the comparison result, if the calculated ratio of the HPB read count H_RD_CNT is equal to or greater than the first reference value (Y of S903), the memory system 110 may determine not to transfer the message to the host 102, the message requesting a change of the detail mode of the flexible control mode (operation S904).

In contrast, as the comparison result, if the calculated ratio of the HPB read count H_RD_CNT is less than the first threshold (N of S903), the memory system 110 may determine to request the host 102 to change the detail mode of the flexible control mode which is currently set (operation S905).

After that, in operations S906 and S907, if the host 102 and the memory system 110 enter the active mode from the idle mode, the memory system 110 may transfer the message to the host 102, the message requesting the change of the detail mode of the flexible control mode. That is, the memory system 110 may request the host 102 to change the host control mode, which is the currently set detail mode of the flexible control mode, to the device control mode. At this time, the message requesting a change of the detail mode of the flexible control mode may be included in the response message corresponding to the command received after the entry into the active mode, and then transferred to the host 102.

In operation S908, if the host 102 receives the message from the memory system 110, the message requesting the change of the detail mode of the flexible control mode, the host 102 may determine whether to change the detail mode of the flexible control mode currently set in the mode register 107.

If the host 102 determines to change the detail mode of the flexible control mode (Y of S908), in operation S909, the host 102 may change the host control mode to the device control mode.

In operation S910, the host 102 may transfer a detail mode change determination message to the memory system 110, the message notifying that the detail mode of the flexible control mode has been changed.

In contrast, if the host 102 determines not to change the detail mode of the flexible control mode (N of S908), in operation S910, the host 102 may transfer a detail mode change determination message to the memory system 110, the message notifying that the detail mode of the flexible control mode has not been changed.

Figure 10:
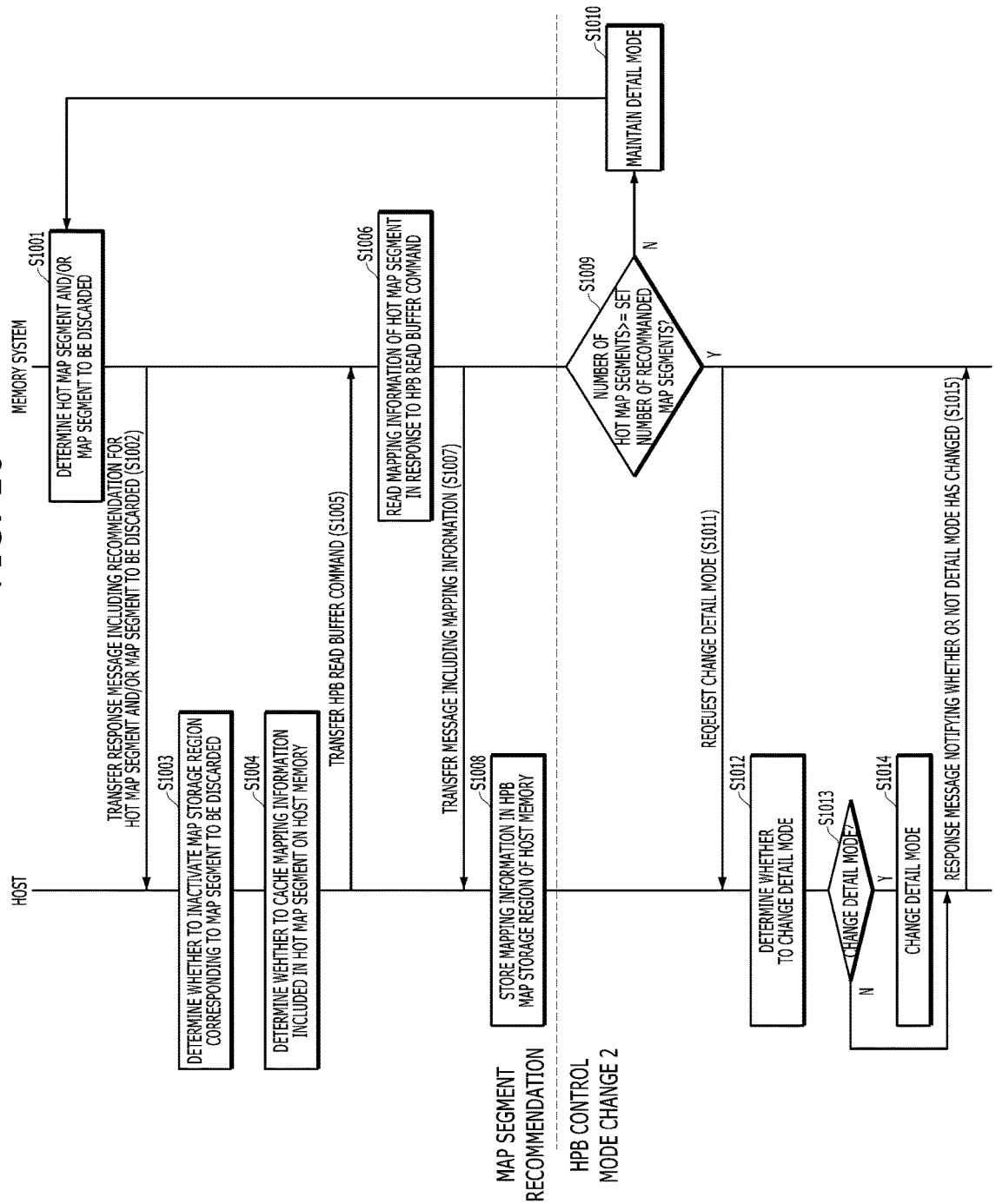

FIG. 10 is a sequence diagram for describing the HPB read buffer command operation and the HPB control mode change operation in response to the device control mode in accordance with an embodiment of the present disclosure. FIG. 10 shows the operations S511 to S513 of FIG. 5 in detail.

Referring to FIG. 10, in operation S1001, the memory system 110 may determine the map segment to be loaded on the host memory 106 and the map segment including the mapping information to be discarded from the host memory 106. Specifically, the memory system 110 may determine the map segment of which the count is equal to or greater than a second reference value among the map segments stored in the map load count table 1443 of the device memory 144 as the map segment that is recommended to be loaded on the host memory 106. Hereinafter, for convenience of description, the map segment to be loaded on the host memory 106 is referred to as a hot map segment.

Furthermore, the controller 130 may determine the map segment to be discarded among the map segments loaded on the host memory 106 based on the bit map of the map segments included in the HPB map segment validity table 1444 managed in the device memory 144.

In operation S1002, the response message including a recommendation for the map segment to be loaded and the map segment to be discarded may be transferred to the host 102. The response message transferred to the host 102 may be the response message to the command which is previously transferred from the host 102 to the memory system 110. The response message transferred to the host 102 may be the response message notifying completion of operations corresponding to the command which is transferred before the operation S1001 from the host 102 to the memory system 110.

In operation S1003, the host 102 may determine whether to discard the mapping information from the HPB map storage region corresponding to the map segment to be discarded in response to the recommendation for the map segment to be discarded. If the host 102 determines to discard the mapping information from the HPB map storage region, the host 102 may delete all of the mapping information included in the HPB map storage region corresponding to the recommended map segment. If the host 102 determines not to discard the mapping information included in the HPB map storage region corresponding to the map segment, the mapping information may be maintained in the host memory 106 despite of the recommendation from the memory system 110.

In operation S1004, the host 102 may determine whether to cache the mapping information included in the hot map segment, which is recommended by the memory system 110, on the host memory 106. If the host 102 determines not to cache mapping information included in the hot map segment, the mapping information stored in the HPB storage regions of the host memory 106 may be maintained without any change despite the recommendation from the memory system 110.

In contrast, if the host 102 determines to cache the mapping information included in the hot map segment, the host 102 may transfer an HPB read buffer command to the memory system 110, the HPB read buffer command requesting mapping information included in the map segment to be loaded (operation S1005).

In operations S1006 and S1007, the controller 130 may read the mapping information of the hot map segment from the memory device 150 in response to the HPB read buffer command received from the host 102, and then transfer the mapping information of the hot map segment, which is included in the response message to the read buffer command, to the host 102.

In operation S1008, the host 102 may store the mapping information of the hot map segment, which is received from the controller 130, on the HPB map storage region.

After the operation S1008, in operation S1009, the memory system 110 may check whether the number of the hot map segments recommended to the host 102 is equal to or greater than the predetermined number of the recommended map segments set by the host 102. In this case, the number of the recommended map segments may be set by the host 102 at performing the initial setup operation. That is, when the host 102 performs the initial setup operation, the host 102 may preset the number of the map segments that are recommended by the memory system 110 at the device control mode.

As the check result, if the number of the recommended hot map segments is less than the predetermined number of the recommended map segments (N of the operation S1009), the memory system 110 may perform the operation S1001 again or operations corresponding to the command received from the host 102 without requesting the host 102 to change the detail mode of the flexible control mode (S1010).

As the check result, if the number of the recommended hot map segments is equal to or greater than the predetermined number of the recommended map segments (Y of the operation S1009), the memory system 110 may transfer a message to the host 102, the message requesting a change of the detail mode of the flexible control mode, in order to request the host 102 to change the detail mode of the flexible control mode (S1011). At this time, the message requesting the change of the detail mode of the flexible control mode may be included in a response message to the command received from the host 102 before the operation S1009, and then transferred.

In operations S1012 and S1013, if the host 102 receives the message from the memory system 110, the message requesting the change of the detail mode of the flexible control mode, the host 102 may determine whether to change the detail mode of the flexible control mode currently set in the mode register 107.

If the host 102 determines to change the detail mode of the flexible control mode (Y of the operation S1013), the host 102 may change the detail mode of the flexible control mode (operation S1014). In addition, in operation S1015, the host 102 may transfer a message to the memory system 110, the message notifying that the detail mode of the flexible control mode has been changed.

In contrast, if the host 102 determines not to change the detail mode of the flexible control mode (N of the operation S1013), the host 102 may transfer a message to the memory system 110, the message notifying that the detail mode of the flexible control mode has not been changed (operation S1015).

Although the detailed embodiments have been described in the detailed description of the present disclosure, the present disclosure may be modified in various ways without departing from the scope of the present disclosure. Accordingly, the scope of the present disclosure should not be construed as being limited to the aforementioned embodiments, but should be defined by not only the claims to be described below, but equivalents thereof. Furthermore, the embodiments may be combined to form additional embodiments.

What is claimed is:

1. A memory system comprising:
    a nonvolatile memory device configured to store a mapping table that includes a plurality of map segments each having mapping information between a logical address and a physical address; and
    a controller configured to:
    transfer the mapping information to a host through a host performance booster (HPB) operation based on a mode, which is selected by the host from a host control mode and a device control mode, and
    selectively request the host to change the selected mode between the host control mode and the device control mode based on a ratio of read requests with physical addresses to all read requests, which are transferred from the host.

2. The memory system of claim 1, wherein the controller is further configured to calculate, in a low power mode, the ratio based on a number of the all read requests and a number of the read requests with the physical addresses.

3. The memory system of claim 1, wherein the controller is configured to request the host to change the selected mode to the device control mode when the ratio is lower than a preset threshold.

4. The memory system of claim 3, wherein the controller is further configured to:
    perform the HPB operation in the device control mode when a message notifying a change to the device control mode is received from the host, and
    request the host to change the device control mode to the host control mode when a number of map segments recommended to the host is equal to or greater than a preset number that is preset by the host.

5. The memory system of claim 1, wherein the controller is configured to request the host to change the selected mode to the host control mode when the ratio is lower than a preset threshold.

6. The memory system of claim 5,
    wherein the controller is further configured to perform the HPB operation in the host control mode when a message notifying a change to the host control mode is received from the host, and wherein the controller requests the host to change the selected mode from the host control mode to the device control mode when the ratio is lower than the preset threshold after the message is received.

7. The memory system of claim 1, wherein the controller is further configured to maintain the selected mode when the ratio is equal to or greater than a preset threshold.

8. The memory system of claim 1, wherein the mapping information, which is transferred to the host, is determined by the host when the selected mode is the host control mode.

9. The memory system of claim 1, wherein the controller is further configured to determine the mapping information, which is transferred to the host when the selected mode is the device control mode.

10. The memory system of claim 1, wherein the controller is configured to request the host to change the selected mode in an active state.

11. An operating method of a memory system comprising:
performing a host performance booster (HPB) operation based on a first control mode determined by an external device and transferring mapping information to the external device;
calculating a ratio of read requests with physical addresses to all read requests received from the external device;
requesting, when the ratio is less than a predetermined ratio value, the external device to change the first control mode to a second control mode; and
performing, when a response message notifying a change to the second control mode is received from the external device, the HPB operation based on the second control mode and transferring mapping information to the external device,
wherein the first control mode is one of a host control mode and a device control mode and the second control mode is the other one of the host control mode and the device control mode.

12. The operating method of claim 11,
wherein the first control mode is the host control mode, and
wherein the performing the HPB operation based on the first control mode includes:
reading, from a nonvolatile memory device, the mapping information corresponding to a logical address range determined by the external device; and
transferring the read mapping information to the external device.

13. The operating method of claim 11,
wherein the second control mode is the device control mode, and
wherein the performing of the HPB operation based on the second control mode includes transferring, to the external device, the mapping information determined by a controller.

14. The operating method of claim 13, further comprising requesting the external device to change the second control mode to the first control mode when a size of mapping information recommended to the external device is equal to or greater than a predetermined size that is predetermined by the external device.

15. The operating method of claim 11, further comprising maintaining the first control mode when the ratio is equal to or greater than the predetermined ratio value.

16. A memory system comprising:
a nonvolatile memory device including a plurality of map segments in which mapping information is stored; and
a controller configured to:
read the mapping information from the nonvolatile memory device based on a first mapping information request mode from an external device and transfer the read mapping information to the external device,
calculate, in an idle mode, a ratio of read requests having physical addresses to all read requests, which are inputted from the external device, and
determine, when the ratio of the read requests having the physical addresses and the all read requests is less than a predetermined reference value, to change the first mapping information request mode to a second mapping information request mode,
wherein one of the first and second mapping information request modes is a host control mode and the other one of the first and second mapping information request modes is a device control mode.

17. The memory system of claim 16, wherein the controller is further configured to maintain the first mapping information request mode when the ratio is equal to or greater than the predetermined reference value.

18. The memory system of claim 16, wherein the controller is further configured to request, when entering an active mode from the idle mode, the external device to change the first mapping information request mode to the second mapping information request mode.

* * * * *